United States Patent
Kawabata

(10) Patent No.: US 11,192,324 B2
(45) Date of Patent: Dec. 7, 2021

(54) COMPOSITE MATERIAL FOR VEHICLE INTERIOR

(71) Applicant: SEIREN CO., LTD., Fukui (JP)

(72) Inventor: Daisuke Kawabata, Fukui (JP)

(73) Assignee: SEIREN CO., LTD., Fuku (JP)

( * ) Notice: Subject to any disclaimer, the term of this patent is extended or adjusted under 35 U.S.C. 154(b) by 0 days.

(21) Appl. No.: 16/616,836

(22) PCT Filed: Jun. 4, 2018

(86) PCT No.: PCT/JP2018/021416
§ 371 (c)(1),
(2) Date: Jun. 24, 2020

(87) PCT Pub. No.: WO2018/225697
PCT Pub. Date: Dec. 13, 2018

(65) Prior Publication Data
US 2020/0324508 A1    Oct. 15, 2020

(30) Foreign Application Priority Data
Jun. 9, 2017    (JP) .............................. JP2017-114664

(51) Int. Cl.
*B60R 13/02* (2006.01)
*B32B 3/28* (2006.01)
(Continued)

(52) U.S. Cl.
CPC ............... *B32B 3/28* (2013.01); *B32B 5/024* (2013.01); *B32B 5/26* (2013.01); *B32B 7/12* (2013.01);
(Continued)

(58) Field of Classification Search
CPC ....... B32B 3/28; B32B 3/04; B32B 2605/003; B32B 5/02; B32B 5/024; B32B 5/26; B60R 13/02
See application file for complete search history.

(56) References Cited

U.S. PATENT DOCUMENTS 5,156,898 A * 10/1992 McDonald ............... B42D 1/06
428/100
2004/0180177 A1* 9/2004 Ray ......................... B32B 27/12
428/86
(Continued)

FOREIGN PATENT DOCUMENTS

CN    1521055 A    8/2004
CN    1673427 A    9/2005
(Continued)

OTHER PUBLICATIONS

International Search Report, PCT/JP2018/021416, dated Jul. 31, 2018, 1 page.
(Continued)

*Primary Examiner* — Alexander S Thomas
(74) *Attorney, Agent, or Firm* — Stinson LLP

(57) ABSTRACT

A composite material for vehicle interior, including: a skin material disposed at one outermost side of the composite material, and having a first principal surface and a second principal surface opposite the first principal surface; and a backing material disposed at the other outermost side of the composite material, so as to face the second principal surface of the skin material. The skin material is formed of a fiber structure body, and has a plurality of first fold lines of folding with the first principal surface of the skin material outward, and a plurality of second fold lines of folding with the first principal surface inward. The first fold lines adjacent to each other are parallel to each other or form an acute angle θ1 of 10° or less, the second fold lines adjacent to each other
(Continued)

are parallel to each other or form an acute angle θ2 of 10° or less, and the first fold line and the second fold line adjacent to each other are parallel to each other or form an acute angle θ12 of 10° or less.

16 Claims, 6 Drawing Sheets

(51) Int. Cl.
    *B32B 5/02*      (2006.01)
    *B32B 5/26*      (2006.01)
    *B32B 7/12*      (2006.01)

(52) U.S. Cl.
    CPC ........ *B60R 13/02* (2013.01); *B32B 2605/003* (2013.01)

(56) References Cited

U.S. PATENT DOCUMENTS

| | | |
|---|---|---|
| 2004/0185239 A1 | 9/2004 | Nakamura et al. |
| 2011/0206891 A1 | 8/2011 | Eguchi et al. |

FOREIGN PATENT DOCUMENTS

| | | |
|---|---|---|
| CN | 1307332 C | 3/2007 |
| CN | 102161330 A | 8/2011 |
| EP | 2361803 A2 | 8/2011 |
| JP | S62104737 A | 5/1987 |
| JP | H0350701 B2 | 8/1991 |
| JP | H0439083 Y2 | 9/1992 |
| JP | H0442109 Y2 | 10/1992 |
| JP | 2001150577 A | 6/2001 |
| WO | 2017006556 A1 | 4/2018 |

OTHER PUBLICATIONS

Written Opinon, PCT/JP2018/021416, dated Jul. 31, 2018, 4 page.
Extended European Search Report dated Dec. 18, 2020 issued in corresponding European Patent Application No. 18813169.2.

* cited by examiner

| Ex. | Weave structure of first principal surface | Fineness of skin fibers (dtex) | Wear resistance | Moldability | Shape-retainability |
|---|---|---|---|---|---|
| 1 |  | 167 | Rank 4 | Excellent | Excellent |
| 2 |  | 167 | Rank 3 | Excellent | Excellent |
| 3 |  | 300 | Rank 4 | Good | Good |
| 4 |  | 167 | Rank 3 or 4 | Excellent | Excellent |

COMPOSITE MATERIAL FOR VEHICLE INTERIOR

REFERENCE TO RELATED APPLICATIONS

This application is a U.S. national stage application based on PCT/JP2018/021416, filed Jun. 4, 2018, claiming priority to Japanese application no. 2017-114664, filed Sep. 6, 2017, the entire disclosures of which are incorporated herein by reference.

TECHNICAL FIELD

The present invention relates to a composite material for vehicle interior.

BACKGROUND ART

Three-dimensional designs are sometimes imparted to vehicle interior materials. For example, Patent Literature 1 teaches forming surface unevenness on a skin material made of polyurethane foam.

CITATION LIST

Patent Literature

PTL 1 WO 2017/006556

SUMMARY OF INVENTION

Problems to be Solved by Invention

There has been a growing trend in recent years for seeking luxuriousness in vehicle interior materials. For example, when the skin material has three-dimensional surface unevenness as in Patent Document 1, the interior material looks more luxurious.

On the other hand, the skin material is required to have wear resistance because it is exposed to frequent contact with the passengers and loaded objects on vehicles. However, when the skin material is made of polyurethane foam, the wear resistance tends to be reduced.

An object of the present invention is to provide a composite material imparted with a three-dimensional and luxurious design and having wear resistance suited for vehicle interior materials.

Means for Solving the Problem

A first aspect of the present disclosure relates to a composite material for vehicle interior, including: a skin material disposed at one outermost side of the composite material, and having a first principal surface and a second principal surface opposite the first principal surface; and a backing material disposed at the other outermost side of the composite material, so as to face the second principal surface of the skin material. The skin material is formed of a fiber structure body, and has a plurality of first fold lines of folding with the first principal surface of the skin material outward and a plurality of second fold lines of folding with the first principal surface inward. The first fold lines adjacent to each other are parallel to each other or form an acute angle $\theta 1$ of 10° or less, the second fold lines adjacent to each other are parallel to each other or form an acute angle $\theta 2$ of 10° or less, and the first fold line and the second fold line adjacent to each other are parallel to each other or form an acute angle $\theta 12$ of 10° or less.

It is preferable that: the skin material further includes a plurality of third fold lines of folding with the first principal surface of the skin material outward, and a plurality of fourth fold lines of folding with the first principal surface inward; the third fold line and the fourth fold line adjacent to each other are parallel to each other or form an acute angle $\theta 34$ of 10° or less; and the third fold line and the fourth fold line intersect with the plurality of first fold lines.

0007 It is preferable that angles $\theta 13$ formed between the first fold line and the third fold line are 90°, or a smaller angle of the angles $\theta 13$ formed between the first fold line and the third fold line is 10° or more.

It is preferable that the composite material for vehicle interior further includes one or more intermediate material sandwiched between the skin material and the backing material.

It is preferable that the intermediate material includes fold lines corresponding to at least one of the first fold lines, the second fold lines, the third fold lines, and the fourth fold lines on the skin material.

It is preferable that fibers exposed from the first principal surface of the skin material has a fineness of 117 to 225 dtex.

It is preferable that: the skin material is a woven fabric formed of first fibers and second fibers intersecting with the first fibers; and in a structure of the first principal surface of the woven fabric, the structure has a pattern in which the first fibers intersect with successive three or more of the second fibers on a first principal surface side, and then intersect with successive two or less of the second fibers on a second principal surface side.

Advantage of the Invention

The composite material for vehicle interior according to the present invention, in which the skin material has a plurality of fold lines, is excellent in design property. Furthermore, the composite material has wear resistance suited for vehicle interior materials. In addition, the fold lines are sharp and have excellent shape-retainability.

DETAILED DESCRIPTION OF THE INVENTION

Figure 1:
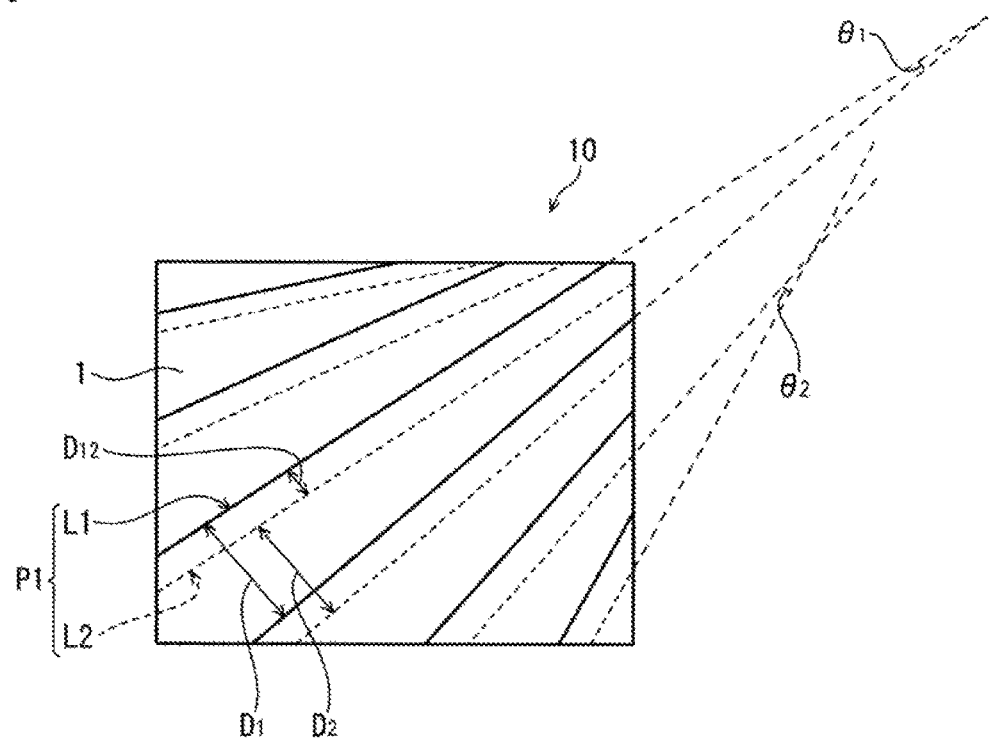
FIG. 1 A schematic partial top view of a composite material for vehicle interior according to an embodiment of the present invention.

A composite material for vehicle interior (hereinafter, sometimes simply referred to as a composite material) according to the present embodiment includes: a skin material disposed at one outermost side of the composite material, and having a first principal surface and a second principal surface opposite the first principal surface; and a backing material disposed at the other outermost side of the composite material, so as to face the second principal surface of the skin material. The composite material can be used as vehicle interior materials, such as a ceiling material, door material, seat material, and floor material. When used as such, the composite material is placed with the skin material facing the internal space of the vehicles.

The skin material has a plurality of first fold lines and a plurality of second fold lines. Along the first fold lines, the skin material is folded with its first principal surface outward. Along the second fold lines, the skin material is folded with its first principal surface inward. These fold lines impart a three-dimensional impression to the skin material and improve the design property, making the composite material look luxurious.

The skin material is formed of a fiber structure body. The skin material, therefore, has excellent wear resistance. The fold lines are formed by folding the skin material into a desired shape, and applying heat thereto. When the skin material is formed of a fiber structure body, the skin material can be easily folded, and therefore, sharp fold lines can be formed into a desired shape. In other words, the skin material as above is easy to be folded into a desired shape and has high processability. Furthermore, the obtained fold lines are sharp and excellent in moldability.

The backing material is laminated on the skin material having the first fold lines and the second fold lines and serve to hold the formed fold lines. Therefore, the fold lines can be well-retained.

(Skin Material)

The skin material has a plurality of first fold lines and a plurality of second fold lines. The first fold line and the second fold line adjacent thereto form one pleat (first pleat) on the skin material.

The first fold lines adjacent to each other are parallel to each other or form an acute angle $\theta 1$ of 10° or less. The second fold lines adjacent to each other are parallel to each other or form an acute angle $\theta 2$ of 10° or less. The first fold line and the second fold line adjacent to each other are parallel to each other or form an acute angle $\theta 12$ of 10° or less. In other words, the first fold line and the second fold line adjacent to each other are formed along the substantially same direction. The acute angle $\theta 12$ is an acute angle formed between the first and second fold lines forming one first pleat.

The acute angle $\theta 1$, the acute angle $\theta 2$, and the acute angle $\theta 12$ may be set according to a desired design, within the above ranges. The acute angle $\theta 1$ and the acute angle $\theta 2$ may be each, for example, 1° or more and 5° or less. The acute angle $\theta 1$ and the acute angle $\theta 2$ may be equal to or different from each other. When the number of the first fold lines and the number of second fold lines are each three or more, each of the acute angles $\theta 1$, $\theta 2$, and $\theta 12$ may or may not be consistent. Each acute angle is a maximum acute angle formed between each pair of fold lines when a composite material 10 is viewed from a skin material 1 side. The same applies to an acute angle $\theta 13$.

The composite material 10 with first fold lines L1 and second fold lines L2 formed thereon, viewed from the skin material 1 side, is partially illustrated in FIG. 1. It is to be noted, however, the arrangement of the fold lines is not limited thereto. FIG. 1 is a schematic partial top view of the composite material 10 according to the present embodiment. In FIG. 1, the acute angle $\theta 1$ and the acute angle $\theta 2$ are each approximately 5°, and the acute angle $\theta 12$ (not shown) is substantially 0°.

A distance D1 between the first fold lines L1 adjacent to each other, a distance D2 between the second fold lines L2 adjacent to each other, and a distance D12 between the first fold line L1 and the second fold line L2 adjacent each other are not limited, and may be set according to a desired design. In view of design property, the distance D1 is preferably 1 to 20 cm. Likewise, the distance D2 is preferably 1 and 20 cm. Furthermore, in view of wear resistance and texture, the distance D12 is preferably 0.5 to 5 cm. Each distance is a maximum distance between each pair of the fold lines when the composite material 10 is viewed from the skin material 1 side. The distance D12 is a width of a first pleat P1.

The skin material is formed of a fiber structure body, such as a woven fabric, a knitted fabric, or a non-woven fabric. The skin material may be a resin-processed fiber structure body, such as an artificial leather or a synthetic leather, or a laminate of fiber structure bodies. By forming the skin material of a fiber structure body, desired fold lines can be formed sharply. The skin material is preferably a woven fabric.

In the case where the skin material is a woven fabric or a knitted fabric, the bowing of the skin material is preferably 2% or less in both the length and width directions. When the bowing is 2% or less, the skin material is stretchable in its length and width directions in a well-balanced matter, and the moldability tends to be improved. The bowing of the woven fabric or the knitted fabric can be measured in accordance with JIS L 1096 8.12 (bias or bowed filling).

In the case where the skin material is a woven fabric, the skin material may have any weave structure. Examples of the weave structure include: three foundation weaves, i.e., plain weave, twill weave, and sateen weave; variations of the three foundation weave; special weaves, such as crepe weave; and a mixed structure of two or more types of these weaves. In view of wear resistance, twill weave or a variation thereof is preferred.

In the case where the skin material is a fabric formed of first fibers and second fibers intersecting with the first fibers, the weave structure of the first principal surface preferably has a pattern in which the first fibers intersect with successive three or more of the second fibers on the first principal surface side, and then intersect with successive two or less of the second fibers on the second principal surface side. In other words, in the weave structure of the first principal surface, the first fibers (e.g., warp yarns) passing over three or more second fibers (e.g., weft yarns) continuously appear on the surface in the direction along the first fibers. As a result, although the skin material itself has surface irregularities due to fold lines, local irregularities on the first principal surface can be reduced. Therefore, the localization of the load applied, when rubbed, to the fibers exposed from the first principal surface is reduced, leading to improved wear resistance. In view of fluff resistance and snagging resistance, the first fibers continuously appearing on the surface in the direction along the first fibers pass over preferably not exceeding five second fibers.

The fibers constituting the skin material (hereinafter referred to as skin fibers) preferably contain a thermoplastic resin. This can further improve the moldability. Examples of fibers containing a thermoplastic resin (hereinafter referred to as thermoplastic fibers) include: synthetic fibers, such as polyester fibers, polypropylene fibers, and nylon fibers; and semi-synthetic fibers, such as acetate fibers and triacetate fibers. These may be used singly or in combination of two or more kinds. Preferred among them are synthetic fibers, more preferred are polyester fibers, and particularly preferred are polyethylene terephthalate (PET) fibers, because of their excellent physical properties (esp., strength, wear resistance, and heat resistance). The fiber structure body may contain fibers other than thermoplastic fibers. Examples of the fibers other than thermoplastic fibers include natural fibers and regenerated fibers. Two or more different kinds of fibers can be combined by, for example, mixed spinning, filament mixing, twisting, interweaving, or interknitting. In terms of the processability, the thermoplastic fibers preferably occupy 50 mass % or more of the skin material.

The fineness of the skin fibers is not limited; however, the skin fibers exposed from the first principal surface of the skin material preferably has a fineness of 117 to 225 dtex. This can further improve the wear resistance of the skin material, as well as the processability and the moldability. The skin fibers not exposed from the first principal surface of the skin material, too, preferably has a fineness of 117 to 225 dtex, in terms of the wear resistance, processability and moldability.

The single fiber fineness constituting the skin fibers is also not limited; however, the skin fibers exposed from the first principal surface of the skin material preferably has a single fiber fineness of 3 dtex or more. This can further improve the wear resistance. The upper limit of the single fiber fineness is not limited, but is preferable 6 dtex, more preferably 4 dtex, in terms of the processability of the fold lines.

The morphology of the skin fibers is also not limited. The skin fibers may be, for example, a short fiber, such as spun yarn, a long fiber, such as multifilament yarn or monofilament yarn, or a long-short composite spun yarn of a short fiber and a long fiber. The multifilament yarn may have been twisted, or subjected to false-twisting process, fluid disturbance treatment, or other processes.

The skin material with the fold lines stretched flat has a thickness T1 which may be any thickness. In view of durability and processability of the fold lines, T1 is preferably 0.5 to 1 mm. When the thickness T1 of the skin material is in the above range, the moldability of the fold lines also can be improved. The thickness T1 of the skin material can be the thickness of the skin material before the formation of fold lines. The thickness T1 of the skin material can be determined by, for example, averaging the thicknesses at any 10 points of the skin material. The thickness of the skin material at a given point can be measured by, for example, PEACOCK H-30 (available from OZAKI MFG. CO., LTD.). The same applies to a thickness T2 of the backing material and a thickness T3 of the intermediate material.

The skin material with the fold lines stretched flat (e.g., the skin material before folding process) has a mass per unit area (hereinafter simply referred to as mass W1) of preferably 200 to 400 g/m2, more preferably 200 to 300 g/m2. In this case, the wear resistance tends to be improved.

(Backing Material)

The backing material is laminated on the skin material and securely holds the first and second fold lines formed on the skin material, thereby to improve the shape-retainability of each fold line.

The backing material may be of any morphology, and may be made of a material as exemplified for the skin material. Preferred is a fiber structure body, and more preferred is a woven fabric, in view of improving the shape-retainability of each fold line.

In the case where the backing material is a fiber structure body, the fibers constituting the backing material (backing fibers) are not limited, and may be as those exemplified for the skin fibers. Preferred are synthetic fibers, more preferred are polyester fibers, and particularly preferred are PET fibers, in view of improving the shape-retainability of the fold lines. The backing fibers also may be of any morphology, examples of which are as those of the skin fibers.

The fineness of the backing fibers is also not limited, and may be 117 to 225 dtex. When the fineness of the backing fibers is in this range, the shape-retainability of the fold lines can be further improved, and the wear resistance of the composite material is likely to be improved.

The backing material has a mass per unit (hereinafter simply referred to as mass W2) of preferably 150 to 400 g/m2, more preferably 150 to 250 g/m2. When the mass W2 is in the range above, the wear resistance of the composite material tends to be improved, and the flexibility is hardly impaired. The thickness T2 of the backing material is not limited, but in view of improving the wear resistance and the shape-retainability of the fold lines, T2 is preferably 0.3 to 0.6 mm.

(First Adhesive Layer)

The skin material and the backing material are bonded to each other via, for example, an adhesive layer (first adhesive layer). The first adhesive layer is interposed between the skin material and the backing material, and bonds the backing material and the skin material together, if necessary, via an intermediate material as described later.

The first adhesive forming the first adhesive layer may be any adhesive. The first adhesive may be a thermoplastic resin or a thermosetting resin. The thermoplastic resin is not limited as long as it exhibits adhesiveness by being cooled after melting, examples of which include polyamide resin, polyester resin, polyurethane resin, polyolefin resin, styrene resin, and acrylic resin. These may be used singly or as a mixture of two or more kinds. Preferred among them is polyamide resin because of its high versatility. The melting point of the thermoplastic resin is preferably 110 to 180° C., more preferably 110 to 150° C., in view of heat resistance and productivity. The thermosetting resin is also not limited, examples of which includes epoxy resin.

The amount of the first adhesive is not limited. In view of adhesiveness, the mass of the first adhesive applied per unit area of the base material to which the first adhesive is to be applied (the skin or intermediate material with the first pleats stretched flat, or the backing material) (hereinafter simply referred to as mass a1) is preferably 10 to 100 g/m2, more preferably 20 to 50 g/m2.

(Intermediate Material)

The skin material and the backing material are preferably arranged with one or more intermediate material sandwiched therebetween. The intermediate material has fold lines corresponding to at least one of the fold lines formed on the skin material and serves to reinforce the fold lines formed on the skin material.

The intermediate material is, for example, folded together with the skin material, as described later. Therefore, the intermediate material is required to be flexible enough to follow the skin material and be sharply folded easily. The intermediate material is required, on the other hand, to have a rigidity that is high enough to reinforce the fold lines formed on the skin material. With these taken into consideration, the intermediate material is preferably a fiber structure body, particularly preferably a woven fabric.

In this case, the fineness of the fibers constituting the intermediate material (third fibers) is preferably 20 to 50 dtex. For the similar reason as above, the intermediate material with the fold lines stretched flat has a mass per unit area (hereinafter simply referred to as mass W3) of preferably 20 to 50 g/m2, more preferably 20 to 40 g/m2. The thickness T3 of the intermediate material with the fold lines stretched flat is preferably 0.2 to 0.5 mm. The type and morphology of the third fibers are not limited, and may be as those of the skin fibers.

(Second Adhesive Layer)

In the case where the composite material includes one or more intermediate material, the skin material to the intermediate material, and further, the intermediate materials to each other are bonded via a second adhesive layer. The first adhesive layer mentioned above bonds the backing material to the intermediate material. In this case, the skin material and the one or more intermediate material are bonded together via the second adhesive layer, and then folded.

The second adhesive layer may also be formed of any adhesive (second adhesive). Examples of the second adhesive are as those of the first adhesive. Given that a laminate of the skin material and the intermediate material(s) may be folded a plurality of times, the second adhesive is preferably a thermoplastic resin having a melting point of 110 to 180° C. Such a second adhesive may be a thermoplastic resin as exemplified for the first adhesive.

The amount of the second adhesive is also not limited. In view of adhesiveness, the mass of the second adhesive per unit area (hereinafter simply referred to as mass a2) is preferably 10 to 100 g/m2, more preferably 20 to 50 g/m2.

(Composite Material)

A composite material according to the present embodiment has excellent wear resistance suited for vehicle interior materials.

For example, when the composite material is abraded on the skin material side by a method according to JIS L1096 8.19.3 C-method (Taber type method), no change, or only slight fuzz is observed on the surface of the skin material.

To impart an intricate three-dimensional shape to the composite material and further improve the design property, it is preferable to further form on the skin material: a plurality of third fold lines intersecting with the plurality of first fold lines L1, the third folding lines of folding with the first principal surface of the skin material outward; and a plurality of fourth fold lines intersecting with the plurality of first fold lines L1, the fourth fold lines of folding with the first principal surface inward. Preferably, the third fold line and the fourth fold line adjacent to each other are parallel to each other or form an acute angle θ34 of 10° or less. The acute angle θ34 may be 1° or more and 5° or less. The third fold line and the fourth fold line adjacent thereto form a pleat (second pleat P2) on the skin material. The first pleats P1 intersect with the second pleats P2.

An angle θ13 formed between the third fold line and the first fold line L1 (see FIG. 3) may be 90° or may be an acute angle. When the third fold line and the first fold line L1 form an acute angle, the angle θ13 is preferably 10° or more. In this case, the design property can be further improved. The angle θ13 is more preferably 20° or more. The angle θ13 is preferably 60° or less, more preferably 50° or less. When the first fold lines L1 are formed radially as illustrated in FIG. 1, the angle θ13 is variable.

The angles formed by the third fold lines adjacent to each other and by the fourth fold lines adjacent to each other are set according to a desired design. The third fold lines adjacent to each other may be parallel to each other or may form an acute angle θ3 (not shown) of 10° or less. The fourth fold lines adjacent to each other may be parallel to each other or may form an acute angle θ4 (not shown) of 10° or less. The acute angle θ3 and the acute angle θ4 may be each, for example, 1° or more and 5° or less. The acute angle θ3 and the acute angle θ4 may be equal to or different from each other. When the numbers of the third fold lines and the fourth fold lines are each three or more, the acute angle θ3 and the acute angle θ4 each may or may not be consistent.

Figure 2:
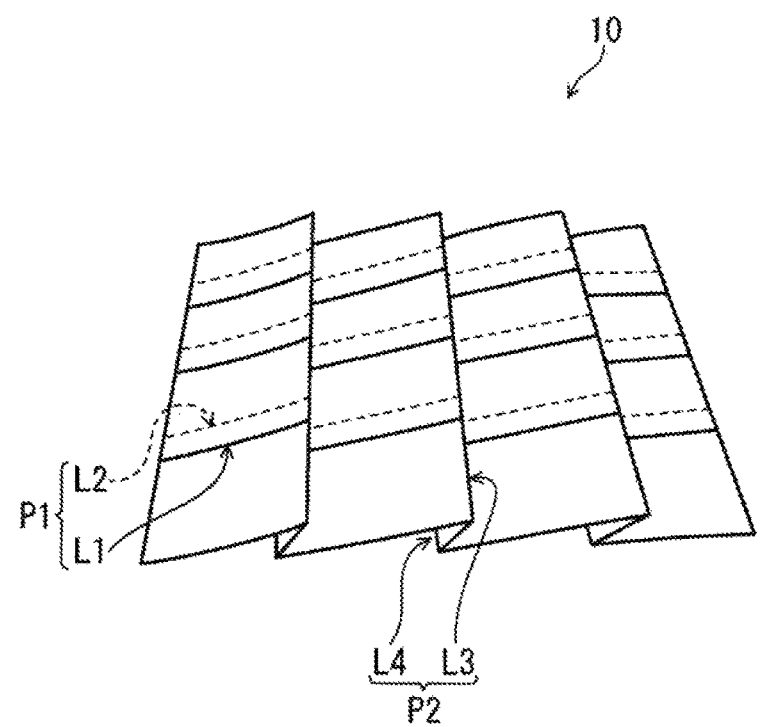
FIG. 2 A schematic partial oblique view of another composite material for vehicle interior according to an embodiment of the present invention.

The composite material 10 with third and fourth fold lines L3 and L4 formed thereon is partially schematically illustrated in FIG. 2. FIG. 2 is a schematic partial oblique view of the composite material 10 according to the present embodiment. The composite material 10 of FIG. 2 includes one layer of intermediate material (not shown), the intermediate material has fold lines corresponding to the third and fourth fold lines L3 and L4. In other words, the first and second fold lines L1 and L2 are formed by folding the skin material (not shown) only, of the composite material 10; whereas, the third and fourth fold lines L3 and L4 are formed by folding the skin material together with the intermediate material, of the composite material 10. In FIG. 2, the acute angle θ34 (not shown) is substantially 0'. Furthermore, the first fold line L1 (further, the second fold line L2) and the third fold line L3, and the first fold line L1 (further, the second fold line L2) and the fourth fold line L4 are each orthogonal to each other (θ13≈90°). It is to be noted, however, that the arrangement of each fold line is not limited to the above.

Figure 3:
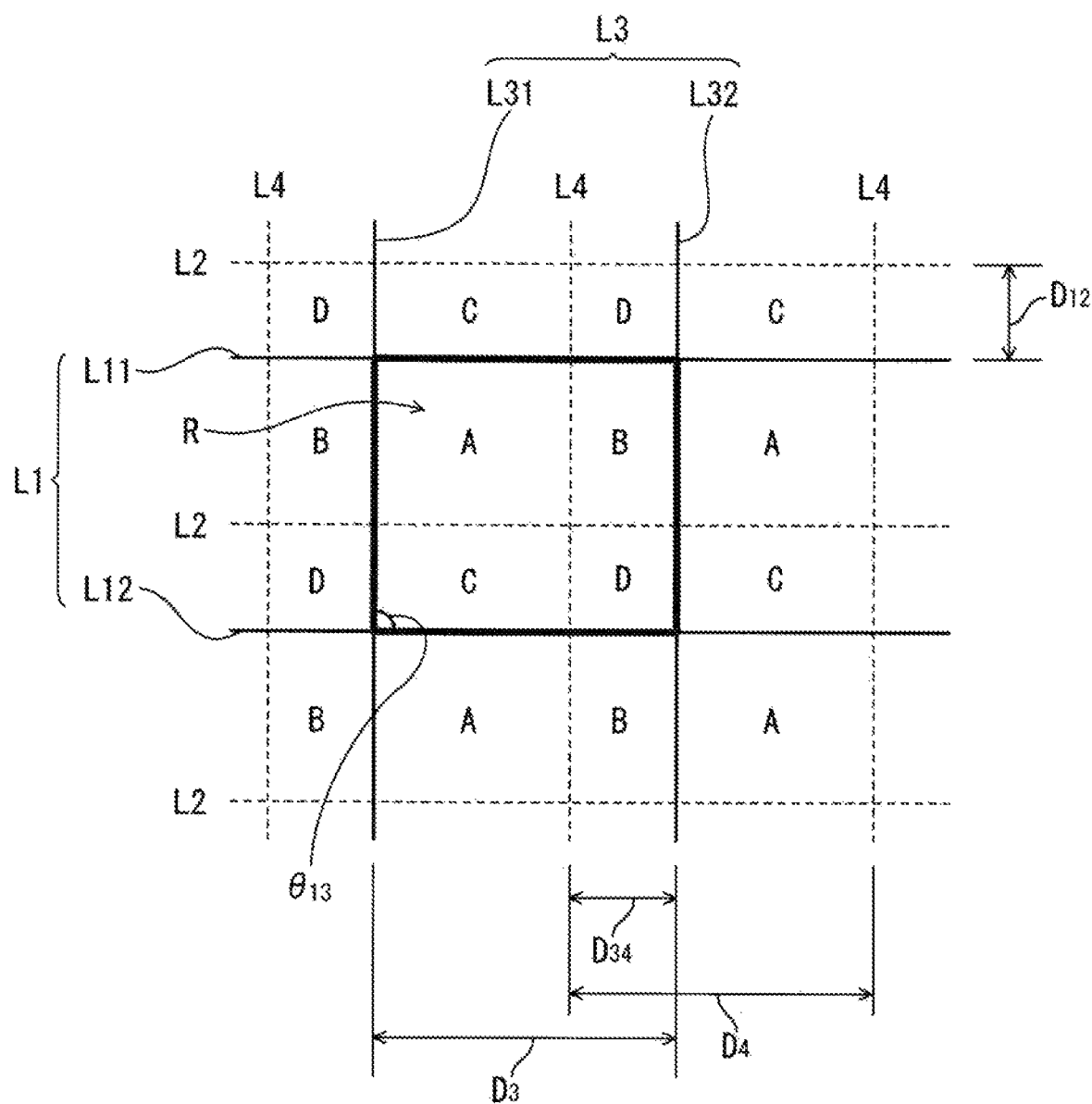
FIG. 3 A schematic partial top view of the composite material for vehicle interior of FIG. 2.

A description is given below of the three-dimensional shape of the composite material 10 of FIG. 2, with reference to FIG. 3. FIG. 3 is a schematic partial top view of the composite material 10 of FIG. 2.

According to the present embodiment, in the composite material 10, a region (hereinafter referred to as unit region R) surrounded by two adjacent first fold lines L1 (L11, L12) and two adjacent third fold lines L3 (L31, L32) includes four sections A to D differing in the apparent number of layers stacked (i.e., the thickness of the cross section).

The size of the unit region R is determined depending on the arrangement of each fold line. In view of design property, the unit region is preferably 1 to 20 cm square in size. To put it differently, when the composite material 10 is viewed from the first principal surface side, it is preferable that the distance D1 (see FIG. 1) is 1 to 20 cm, and a distance D3 between the third fold lines L3 adjacent to each other is 1 to 20 cm. Likewise, a distance D4 between the fourth fold lines L4 adjacent to each other is preferably 1 to 20 cm. In view of wear resistance and texture, a distance D34 between the third fold line L3 and the fourth fold line L4 adjacent to each other (the width of the second pleat P2) is preferably 0.5 to 5 cm.

The section A includes the skin material, the intermediate material, and the backing material, each in one layer, in this order from the skin material side. In the section B, the skin material is folded along the first fold line L1 and the second fold line L2. Therefore, the section B apparently includes three layers of the skin material, one layer of the intermediate material, and one layer of the backing material in this order from the skin material side. The section C apparently includes one layer of the skin material, two layers of the intermediate material, two layers of the skin material, one layer of the intermediate material, and one layer of the backing material in this order from the skin material side. In the section D, the skin material and the intermediate material are folded along the third fold line L3 and the fourth fold line L4. Therefore, the section D apparently includes three layers of the skin material, two layers of the intermediate material, six layers of the skin material, one layer of the intermediate material, and one layer of the backing material in this order from the skin material side. In short, in the unit region R, the thickness of the composite material 10 increases stepwise from the section A to D. As described above, according to the present embodiment, the thickness of the composite material 10 varies stepwise within a small region of 20 cm×20 cm or less, and this can enhance the three-dimensional impression.

In the composite material 10, the thickness of the thinnest section (e.g., the section A in FIG. 3) is preferably 1 mm to 2.5 mm, more preferably 1 mm to 2 mm, in view of wear resistance. In the composite material 10, the thickness of the thickest section (e.g., the section D in FIG. 3) is preferably 3 mm to 10 mm, more preferably 4 mm to 8 mm, in view of wear resistance and design property.

In the composite material 10, the difference in thickness between the thinnest section and the thickest section is preferably 2 mm or more, in view of design property, and preferably 8 mm or less, in view of wear resistance. In the case where the thickness varies in three or more steps in the composite material 10, the difference in thickness between one step and the next is preferably 0.3 to 6.6 mm, more preferably 0.5 to 2 mm. This can further improve the design property and wear resistance.

In the composite material 10, the thickness varies in two or more steps. The thickness varies preferably in four steps or so, at maximum. When the variation in thickness is within this range, uneven stiffness of the composite material 10 is unlikely to matter when the composite material 10 is installed in a vehicle. This can result in improved workability.

(Production Method of Composite Material)

A description is given below of a production method of the composite material. It is noted, however, that the production method of the composite material of the present embodiment is not limited thereto.

The composite material is produced by a method including, for example, a fold lines formation step of forming a plurality of first fold lines L1 and second fold lines L2 on a skin material, and a backing material lamination step of laminating a backing material via a first adhesive layer to the skin material with the fold lines formed thereon.

(1) Fold Lines Formation Step

The method of forming the first fold lines L1 and the second fold lines L2 on the skin material is not limited, and may be any conventionally known method. In an exemplary method, the skin material is sandwiched between a pair of pattern sheets and then folded together with the pattern sheets. Thereafter, with the pattern sheets removed, heat treatment is applied to secure the folds. The folding may be performed by hand (so-called hand creasing), or by using a folding machine of reciprocate type, rotary type, striping type, or the like. Prior to the fold lines formation step, the skin material is subjected to, as necessary, a pretreatment process like presetting or scouring, and a coloring process like dyeing.

The fold lines formation step may be performed multiple times. This can form the third fold lines L3 and the fourth fold lines L4 as illustrated in FIG. 2. For example, after the formation of the first and second fold lines L1 and L2 on the skin material, with the skin material turned in a different direction, the fold lines formation step is performed for the second time using the same pattern sheets again. Alternatively, the fold lines formation step is performed on the skin material with the first and second fold lines L1 and L2 formed thereon, for the second time using another pair of pattern sheets.

(2) Backing Material Lamination Step

A backing material is laminated via a first adhesive layer onto one principal surface of the skin material with desired fold lines formed thereon. In this way, a composite material can be obtained. The composite material laminated with the backing material is preferably pressed under heat. This can make the fold lines sharp and further improve the shape-retainability. Heating and pressing of the composite material can be performed using a conventionally known machine. The conditions therefore are also not limited, and may be set as appropriate according to the machine to be used, the properties of the composite material, and other factors.

The first adhesive layer is formed by laminating a first adhesive in the form of a film or a non-woven fabric onto the skin material or the backing material (or the intermediate material), or by applying a first adhesive in the form of a solution to the skin material or the backing material (or the intermediate material), followed by heating. The first adhesive layer is preferably formed of a first adhesive in the form of a non-woven fabric, in view of improving the shape-retainability of the fold lines. For example, the first adhesive layer is formed upon melting of a non-woven fabric made of a fibrous thermoplastic resin.

(3) Intermediate Material Lamination Step

Prior to the backing material lamination step, an intermediate material may be laminated onto the skin material via a second adhesive layer.

In this case, the fold lines formation step may be performed on a laminate of the skin material and the intermediate material. This forms on the intermediate material fold lines corresponding to at least one of the first, second, third, and fourth fold lines. In the case where folding is performed multiple times, the laminate of the skin material and the intermediate material may be successively folded multiple times. Alternatively, after the laminate of the skin material and the intermediate material is subjected to the first folding, another intermediate material is laminated onto the laminate on the intermediate material side via the second adhesive layer, and then the second and subsequent folding may be performed. Put it differently, after the Nth (N □ 1) folding, the Mth (M □ 1) intermediate material is laminated onto the skin material (or the laminate of the skin material and the intermediate material) with fold lines formed thereon, and then the (N+1)th folding may be performed. When folded in this way, intricate folds can be formed, and their shape-retainability can be improved.

In view of moldability, the second adhesive layer is preferably formed of a second adhesive in the form of a non-woven fabric. For example, similarly to the first adhesive layer, the second adhesive layer is formed upon melting of a non-woven fabric made of a fibrous thermoplastic resin.

EXAMPLES

The present invention will be specifically described below with reference to Examples. The present invention, however, is not limited to the following Examples.

The obtained composite material was evaluated according to the following method.

(1) Wear Resistance

Measurements were carried out according to JIS L1096 8.19.3 C-Method (Taber type method) under the following conditions. Five test pieces, each being a circular piece of 120 mm in dimeter, were cut out from the composite material. The composite material was rubbed on the skin material side under the following test conditions: wear ring CS-10, load 4.9 N, revolution 5,000. The test pieces after rubbing were observed and rated according to the following criteria. Rank 3 or better can be considered as having wear resistance suited for use as a vehicle interior material.

(Evaluation Criteria)

Rank 5: No change was observed in the surface condition.
Rank 4: Slight fuzz was observed on the fibers.
Rank 3: Fuzz was observed on the fibers, but no change was observed in the yarn condition.
Rank 2: Fuzz was observed on the fibers, and the yarns were thinned.
Rank 1: Yarn breakage was observed.

(2) Moldability and Shape-Retainability of Fold Lines

The shape of the fold lines of each test piece before and after the above wear resistance test was rated according to the following criteria. The shape of the fold lines of the test piece before the wear resistance test was evaluated as the moldability, and the shape of the fold lines of the test piece after the wear resistance test was evaluated as the shape-retainability.

(Evaluation Criteria)

Excellent: The fold lines were not blunted at all and was very sharp.
Good: The fold lines were not blunted and was sharp.
Poor: The fold lines were blunted and lacking in sharpness.

Example 1

A skin material as below was folded using a pair of pattern sheets and pressed under heat, to form first fold lines and second fold lines.

The skin material was a woven fabric having a mass W1: 250 g/m2 (warp and weft yarns: PET fibers with fineness of 167 dtex/48 filaments; density: warp 180 yarns/25.4 mm, weft 60 yarns/25.4 mm; thickness T1: 0.7 mm; bowing: 0.5%). The structure of the first principal surface of the skin material was a variation of twill weave and had a repetitive pattern in which warp yarns intersected with three weft yarns on the first principal surface side, and then intersected with two weft yarns on the second principal surface side.

An intermediate material as below was laminated on the second principal surface of the obtained skin material via a second adhesive layer being a non-woven fabric-like polyamide resin (adhesive A1, melting point: 112° C.) having a mass a2 of 30 g/m2. Thereafter, the obtained laminate was pressed under heat at a temperature of 130° C.

The intermediate material was a plain woven fabric (mass W3: 30 g/m2, warp and weft yarns: PET fibers of 34 dtex, density: warp 82 yarns/25.4 mm, weft 48 yarns/25.4 mm, thickness T3: 0.35 mm).

The resultant laminate was folded using another pair of pattern sheets. Subsequently, the pattern sheets were removed, and then, the laminate was pressed under heat at 130° C., to form first fold lines L1, second fold lines L2, third fold lines L3, and fourth fold lines L4 as illustrated in FIG. 2. The acute angles θ1, θ2, θ12, θ3, θ4, and θ34 were all approximately 0°, and the angle θ13 was approximately 90°. The distance D1 was 5 cm, the distance D2 was 5 cm, the distance D12 was 1 cm, the distance D3 was 5 cm, the distance D4 was 5 cm, and the distance D34 was 1 cm. The composite material included a section A (thickness: 1.5 mm), a section B (thickness: 2.4 mm), a section C (thickness: 5 mm), and a section D (thickness: 5.9 mm) as illustrated in FIG. 3.

Figure 4A:
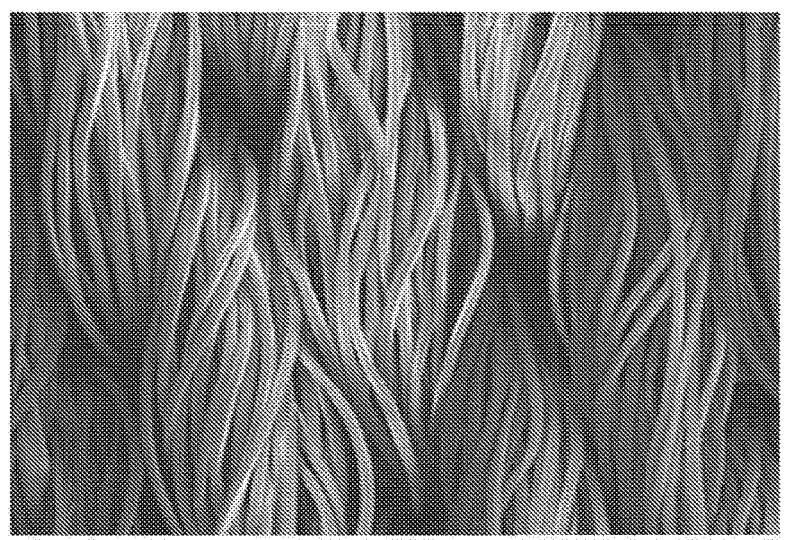
FIG. 4A A photograph (magnification: 100×) of a composite material for vehicle interior of Example 1 taken from a skin material side by scanning electron microscopy (SEM).
Figure 4B:
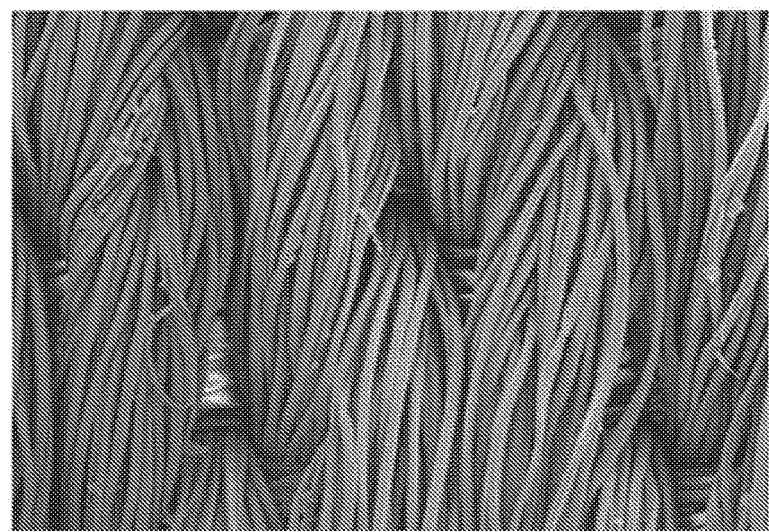
FIG. 4B A photograph (magnification: 100×) of the composite material for vehicle interior of Example 1 after a wear resistance test taken from the skin material side by SEM.
Figure 8:
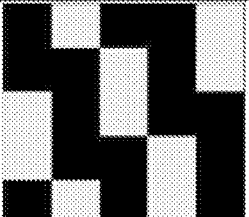
FIG. 8 presents evaluation results in the table format discussed in Examples 1 through 4.
Figure 8:
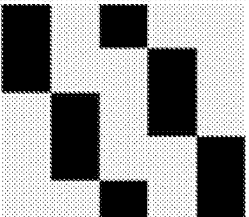
Figure 8:
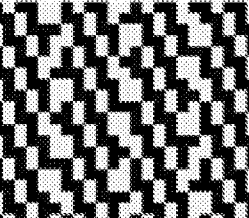
Figure 8:
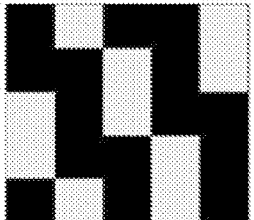

Thereafter, a backing material as below was laminated on the intermediate material side of the laminate via a first adhesive layer (adhesive A1, mass a1: 30 g/m$^2$). The resultant laminate was then pressed under heat at 170° C., to obtain a composite material for vehicle interior. Evaluation results are shown in the table in FIG. 8. A photograph of the composite material before wear resistance test taken from the skin material side is shown in FIG. 4A, and a photograph after the test is shown in FIG. 4B.

The backing material was a dobby woven fabric having a mass W2: 190 g/m2 (warp and weft yarns: PET fibers of 167 dtex/48 filaments; density: warp 120 yarns/25.4 mm, weft 70 yarns/25.4 mm; thickness T2: 0.45 mm).

Example 2

Figure 5A:
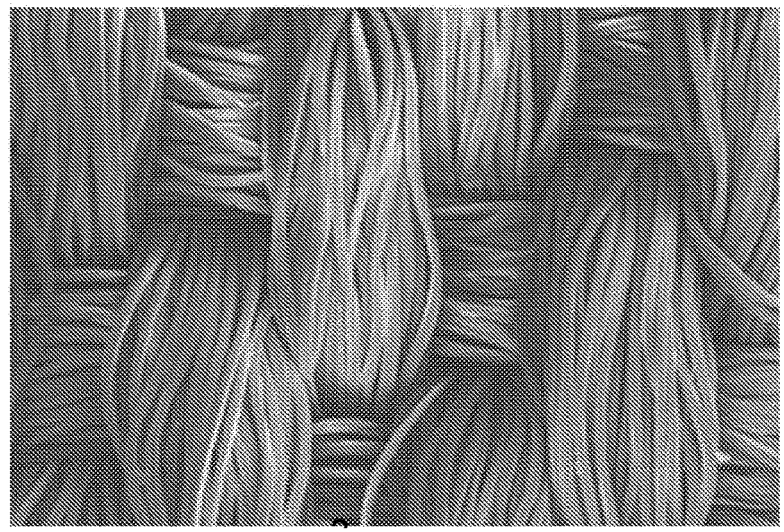
FIG. 5A A photograph (magnification: 100×) of a composite material for vehicle interior of Example 2 taken from the skin material side by SEM.
Figure 5B:
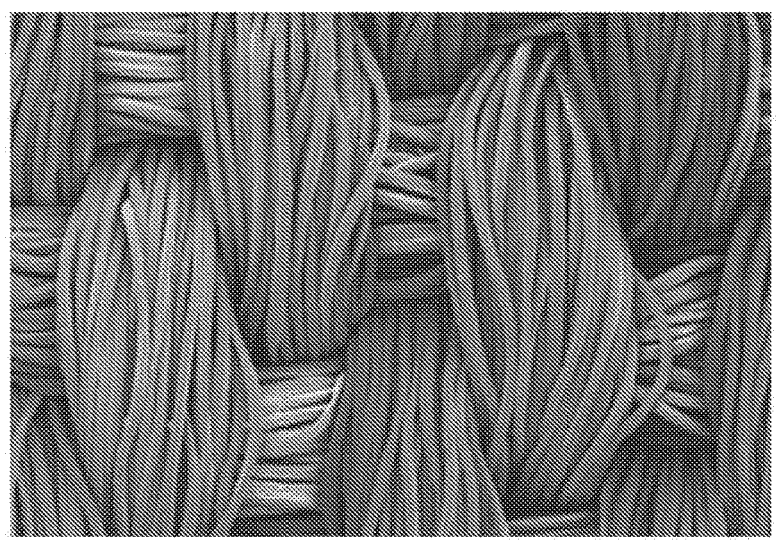
FIG. 5B A photograph (magnification: 100×) of the composite material for vehicle interior of Example 2 after the wear resistance test taken from the skin material side by SEM.

A composite material for vehicle interior was obtained in the same manner as in Example 1, except for using a skin material whose first principal surface had a structure being a variation of twill weave and having a repetitive pattern in which warp yarns intersected with two weft yarns on the first principal surface side, and then intersected with three weft yarns on the second principal surface side. Evaluation results are shown in the table in FIG. 8. A photograph of the composite material before wear resistance test taken from the skin material side is shown in FIG. 5A, and a photograph after the test is shown in FIG. 5B.

Example 3

Figure 6A:
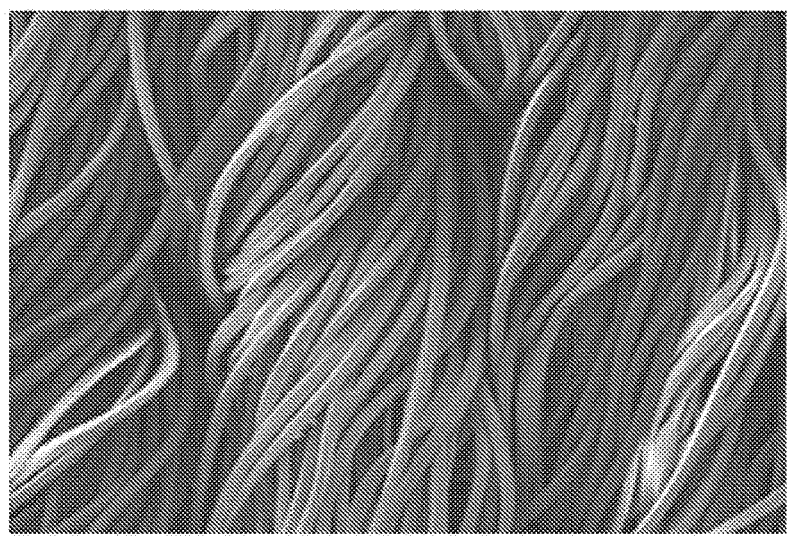
FIG. 6A A photograph (magnification: 100×) of a composite material for vehicle interior of Example 3 taken from the skin material side by SEM.
Figure 6B:
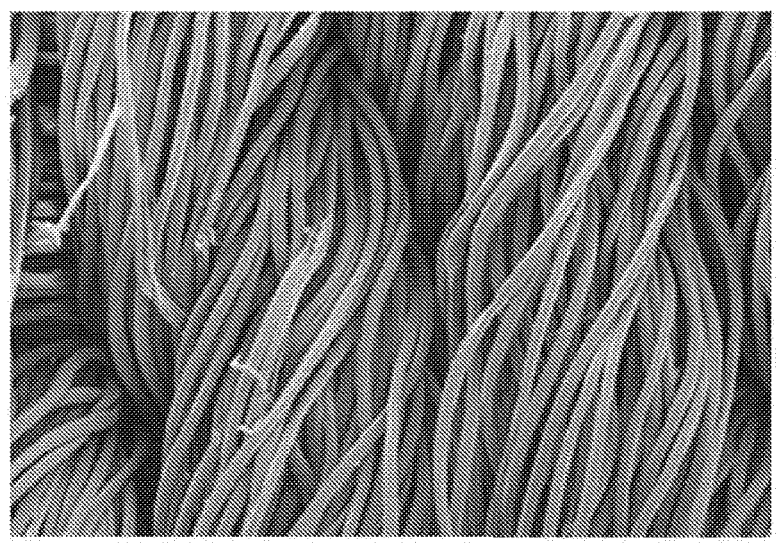
FIG. 6B A photograph (magnification: 100×) of the composite material for vehicle interior of Example 3 after the wear resistance test taken from the skin material side by SEM.

A composite material for vehicle interior was obtained in the same manner as in Example 1, except that for using a skin material whose first principal surface had a structure being a variation of twill weave and having a pattern in which warp yarns intersected with three weft yarns on the first principal surface side, and then intersected with two weft yarns on the second principal surface side, and a pattern in which warp yarns intersected with three weft yarns on the first principal surface side, and then intersected with one weft yarn on the second principal surface side, the skin material being a woven fabric having a mass W1: 300 g/m2. The details of the woven fabric were as follows: warp and weft yarns: PET fibers of 300 dtex/72 filaments; density: warp 150 yarns/25.4 mm, weft 50 yarns/25.4 mm; thickness T1: 1.0 mm, bowing: 0.5%. Evaluation results are shown in the table in FIG. 8. A photograph of the composite material before wear resistance test taken from the skin material side is shown in FIG. 6A, and a photograph after the test is shown in FIG. 6B.

Example 4

Figure 7A:
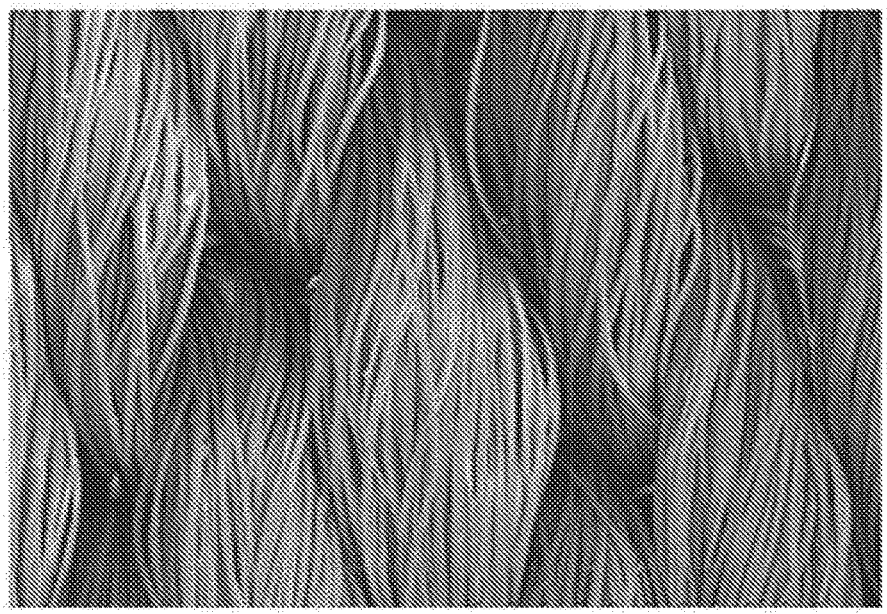
FIG. 7A A photograph (magnification: 100×) of a composite material for vehicle interior of Example 4 taken from the skin material side by SEM.
Figure 7B:
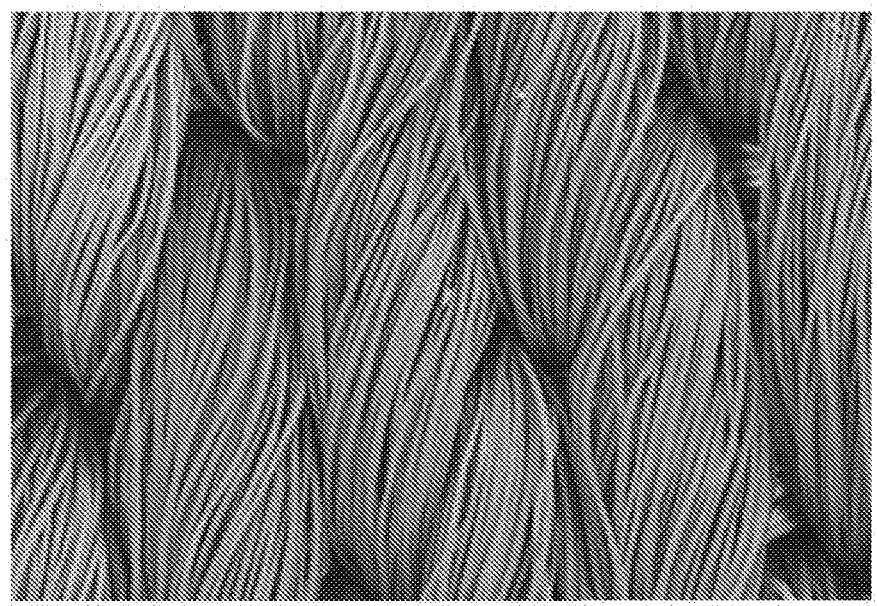
FIG. 7B A photograph (magnification: 100×) of the composite material for vehicle interior of Example 4 after the wear resistance test taken from the skin material side by SEM.

A composite material for vehicle interior was obtained in the same manner as in Example 1 using a woven fabric having a similar weave structure to that in Example 1, except for using a skin material having a mass W1: 250 g/m2, in which warp and weft yarns: PET fibers of 167 dtex/144 filaments; density: warp 180 yarns/25.4 mm, weft 60 yarns/25.4 mm; thickness T1: 0.7 mm, bowing: 0.5%. Evaluation results are shown in the table in FIG. 8. A photograph of the composite material before wear resistance test taken from the skin material side is shown in FIG. 7A, and a photograph after the test is shown in FIG. 7B.

The composite materials of Examples 1 to 4 were all excellent or good in wear resistance, moldability, and shape-retainability. In particular, the composite material of Example 1 was rated as rank 4 even after having subjected to rubbing 10,000 times, showing excellency in wear resistance.

INDUSTRIAL APPLICABILITY

The composite material of the present invention is excellent in design property and has wear resistant, and therefore, can be suitably used as a vehicle interior material.

REFERENCE SIGNS LIST

10: Composite material
L1, L11, L12: First fold line
L2: Second fold line
L3, L31, L32: Third fold line
L4: Fourth fold line
P1: First pleat
P2: Second pleat

The invention claimed is:

1. A composite material for vehicle interior, comprising:
a skin material disposed at one outermost side of the composite material, and having a first principal surface and a second principal surface opposite the first principal surface; and
a backing material disposed at the other outermost side of the composite material, so as to face the second principal surface of the skin material,
the skin material being formed of a fiber structure body, and having a plurality of first fold lines of folding with the first principal surface of the skin material outward and a plurality of second fold lines of folding with the first principal surface inward,
the first fold lines adjacent to each other being parallel to each other or forming an acute angle $\theta_1$ of 10° or less,
the second fold lines adjacent to each other being parallel to each other or forming an acute angle $\theta_2$ of 10° or less,
the first fold lines and the second fold lines adjacent to each other being parallel to each other or forming an acute angle $\theta_{12}$ of 10° or less,
the backing material securely holding the first and second fold lines formed on the skin material,
the first fold lines adjacent to each other being arranged apart from each other, and
the second fold lines adjacent to each other being arranged apart from each other.

2. A composite material for vehicle interior, comprising:
a skin material disposed at one outermost side of the composite material, and having a first principal surface and a second principal surface opposite the first principal surface; and
a backing material disposed at the other outermost side of the composite material, so as to face the second principal surface of the skin material,
the skin material being formed of a fiber structure body, and having a plurality of first fold lines of folding with the first principal surface of the skin material outward and a plurality of second fold lines of folding with the first principal surface inward,
the first fold lines adjacent to each other being parallel to each other or forming an acute angle $\theta_1$ of 10° or less,
the second fold lines adjacent to each other being parallel to each other or forming an acute angle $\theta_2$ of 10° or less,
the first fold lines and the second fold lines adjacent to each other being parallel to each other or forming an acute angle $\theta_{12}$ of 10° or less,
the backing material securely holding the first and second fold lines formed on the skin material,
the skin material further includes a plurality of third fold lines of folding with the first principal surface of the skin material outward, and a plurality of fourth fold lines of folding with the first principal surface inward,
the third fold lines and the fourth fold lines adjacent to each other are parallel to each other or form an acute angle $\theta_{34}$ of 10° or less, and
the third fold lines and the fourth fold lines intersect with the plurality of first fold lines.

3. The composite material for vehicle interior of claim 2, wherein angles $\theta_{13}$ formed between the first fold lines and the third fold lines are 90°, or a smaller angle of the angles $\theta_{13}$ formed between the first fold lines and the third fold lines is 10° or more.

4. The composite material for vehicle interior of claim 3, further comprising one or more intermediate material sandwiched between the skin material and the backing material.

5. The composite material for vehicle interior of claim 3, wherein fibers exposed from the first principal surface of the skin material has a fineness of 117 to 225 dtex.

6. The composite material for vehicle interior of claim 3, wherein
the skin material is a woven fabric formed of first fibers and second fibers intersecting with the first fibers, and
in a structure of the first principal surface of the woven fabric,
the structure has a pattern in which the first fibers intersect with successive three or more of the second fibers on a first principal surface side, and then intersect with successive two or less of the second fibers on a second principal surface side.

7. The composite material for vehicle interior of claim 2, further comprising one or more intermediate material sandwiched between the skin material and the backing material.

8. The composite material for vehicle interior of claim 7, wherein the intermediate material includes fold lines corresponding to at least one of the first fold lines, the second fold lines, the third fold lines, and the fourth fold lines on the skin material.

9. The composite material for vehicle interior of claim 8, wherein fibers exposed from the first principal surface of the skin material has a fineness of 117 to 225 dtex.

10. The composite material for vehicle interior of claim 8, wherein
the skin material is a woven fabric formed of first fibers and second fibers intersecting with the first fibers, and in a structure of the first principal surface of the woven fabric,
the structure has a pattern in which the first fibers intersect with successive three or more of the second fibers on a first principal surface side, and then intersect with successive two or less of the second fibers on a second principal surface side.

11. The composite material for vehicle interior of claim 7, wherein fibers exposed from the first principal surface of the skin material has a fineness of 117 to 225 dtex.

12. The composite material for vehicle interior of claim 7, wherein
the skin material is a woven fabric formed of first fibers and second fibers intersecting with the first fibers, and in a structure of the first principal surface of the woven fabric,
the structure has a pattern in which the first fibers intersect with successive three or more of the second fibers on a first principal surface side, and then intersect with successive two or less of the second fibers on a second principal surface side.

13. The composite material for vehicle interior of claim 2, wherein fibers exposed from the first principal surface of the skin material has a fineness of 117 to 225 dtex.

14. The composite material for vehicle interior of claim 2, wherein
the skin material is a woven fabric formed of first fibers and second fibers intersecting with the first fibers, and in a structure of the first principal surface of the woven fabric,
the structure has a pattern in which the first fibers intersect with successive three or more of the second fibers on a first principal surface side, and then intersect with successive two or less of the second fibers on a second principal surface side.

15. A composite material for vehicle interior, comprising:
a skin material disposed at one outermost side of the composite material, and having a first principal surface and a second principal surface opposite the first principal surface; and
a backing material disposed at the other outermost side of the composite material, so as to face the second principal surface of the skin material,
the skin material being formed of a fiber structure body, and having a plurality of first fold lines of folding with the first principal surface of the skin material outward and a plurality of second fold lines of folding with the first principal surface inward,
the first fold lines adjacent to each other being parallel to each other or forming an acute angle $\theta_1$ of 10° or less,
the second fold lines adjacent to each other being parallel to each other or forming an acute angle $\theta_2$ of 10° or less,
the first fold lines and the second fold lines adjacent to each other being parallel to each other or forming an acute angle $\theta_{12}$ of 10° or less,
wherein fibers exposed from the first principal surface of the skin material has a fineness of 117 to 225 dtex.

16. A composite material for vehicle interior, comprising:
a skin material disposed at one outermost side of the composite material, and having a first principal surface and a second principal surface opposite the first principal surface; and
a backing material disposed at the other outermost side of the composite material, so as to face the second principal surface of the skin material,
the skin material being formed of a fiber structure body, and having a plurality of first fold lines of folding with the first principal surface of the skin material outward and a plurality of second fold lines of folding with the first principal surface inward,
the first fold lines adjacent to each other being parallel to each other or forming an acute angle $\theta_1$ of 10° or less,
the second fold lines adjacent to each other being parallel to each other or forming an acute angle $\theta_2$ of 10° or less,
the first fold lines and the second fold lines adjacent to each other being parallel to each other or forming an acute angle $\theta_{12}$ of 10° or less, wherein
the skin material is a woven fabric formed of first fibers and second fibers intersecting with the first fibers, and
in a structure of the first principal surface of the woven fabric,
the structure has a pattern in which the first fibers intersect with successive three or more of the second fibers on a first principal surface side, and then intersect with successive two or less of the second fibers on a second principal surface side.

* * * * *